US012270307B2

(12) United States Patent
Girardeau et al.

(10) Patent No.: US 12,270,307 B2
(45) Date of Patent: Apr. 8, 2025

(54) TURBINE ROTOR FOR A TURBOMACHINE

(71) Applicant: SAFRAN AIRCRAFT ENGINES, Paris (FR)

(72) Inventors: Julian Nicolas Girardeau, Moissy-Cramayel (FR); Benoit Guillaume Silet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 20 days.

(21) Appl. No.: 18/271,893

(22) PCT Filed: Jan. 18, 2022

(86) PCT No.: PCT/FR2022/050095
§ 371 (c)(1),
(2) Date: Jul. 12, 2023

(87) PCT Pub. No.: WO2022/157448
PCT Pub. Date: Jul. 28, 2022

(65) Prior Publication Data
US 2024/0117750 A1    Apr. 11, 2024

(30) Foreign Application Priority Data

Jan. 21, 2021   (FR) ..................................... 2100570

(51) Int. Cl.
*F01D 11/12*  (2006.01)
*F01D 5/20*  (2006.01)
*F01D 5/22*  (2006.01)

(52) U.S. Cl.
CPC .............. *F01D 11/122* (2013.01); *F01D 5/20* (2013.01); *F01D 5/225* (2013.01);
(Continued)

(58) Field of Classification Search
CPC .......... F01D 5/225; F01D 5/20; F01D 11/008; F01D 11/122; F05D 2250/11; F05D 2250/12; F05D 2250/18–185
See application file for complete search history.

(56) References Cited

U.S. PATENT DOCUMENTS 23,330 A  *  3/1859  Wilson ................. B23D 61/121
                                                                83/851
5,756,217 A  *  5/1998  Schroder ................... C23C 4/01
                                                                428/210
(Continued)

FOREIGN PATENT DOCUMENTS

FR       2661945      * 11/1991  ............. F01D 5/225
FR    3 072 121 A1     4/2019
(Continued)

OTHER PUBLICATIONS

Borufka, Machine Translation of FR2661945, 1991 (Year: 1991).*
(Continued)

*Primary Examiner* — Michael K. Reitz
(74) *Attorney, Agent, or Firm* — Sughrue Mion, PLLC (57) ABSTRACT

A rotor of a turbine extending around a longitudinal axis includes a rotor disc bearing at its periphery one or more rotor blades, each blade including an airfoil provided at its radially outer end with a platform equipped with an upstream lip and a downstream lip, the platform having a front lateral edge and a back lateral edge with respect to the normal direction of rotation of the rotor about the longitudinal axis, and a suction face portion which extends from the front lateral edge to the suction face of the airfoil. The upstream lip and the downstream lip each includes sawtooth-shaped cut-outs such as to form a front tooth and a back tooth which are contiguous, in that the back tooth has
(Continued)

a cutting edge and in that the front tooth of each lip is disposed on the suction face portion of the platform.

14 Claims, 5 Drawing Sheets

(52) U.S. Cl.
CPC ...... *F05D 2250/11* (2013.01); *F05D 2250/12* (2013.01); *F05D 2250/18* (2013.01)

(56) References Cited

U.S. PATENT DOCUMENTS

| | | | |
|---|---|---|---|
| 6,916,021 B2* | 7/2005 | Beeck | F01D 11/08 |
| | | | 277/411 |
| 2018/0010467 A1 | 1/2018 | Zhang et al. | |

FOREIGN PATENT DOCUMENTS

| | | |
|---|---|---|
| FR | 3 072 716 A1 | 4/2019 |
| FR | 3 079 868 A1 | 10/2019 |

OTHER PUBLICATIONS

Machine Translation (Year: 1991).*
French Preliminary Search Report for FR 2100570 dated Sep. 20, 2021.
International Search Report for PCT/FR2022/050095 dated Apr. 7, 2022.

* cited by examiner

TURBINE ROTOR FOR A TURBOMACHINE

CROSS REFERENCE TO RELATED APPLICATIONS

This application is a National Stage of International Application No. PCT/FR2022/050095 filed Jan. 18, 2022, claiming priority based on French Patent Application No. 2100570 filed Jan. 21, 2021, the contents of each of which being herein incorporated by reference in their entireties.

FIELD OF THE INVENTION

The invention lies in the field of turbomachines, particularly for aircraft.

This invention more precisely relates to a turbine rotor, a turbine comprising such a rotor and a turbomachine equipped with such a turbine.

The turbine is preferably a low-pressure turbine.

PRIOR ART

A gas turbomachine for twin spool aircraft successively comprises, from upstream to downstream, a low-pressure compressor, a high-pressure compressor, a combustion chamber, a high-pressure turbine and a low-pressure turbine. In the rest of the description and the claims, the upstream and downstream are defined with respect to the general direction of flow of the gas (from upstream to downstream) inside the turbomachine and therefore the turbine.

A turbine comprises several successive stages, each stage including a rotor and a stator which comprises a nozzle provided with fixed blades. The turbine extends along a longitudinal axis corresponding to the axis of rotation of the rotor.

The rotor comprises a rotor disc bearing at its periphery a plurality of blades extending radially or substantially radially from this disc. The radial direction is a direction perpendicular to the axis of the turbine and intersecting this axis.

Each blade comprises a profiled airfoil which extends at its distal end (i.e. the end furthest from the axis of rotation) by a radially outer heel. This radially outer heel comprises a platform, which delimits the outer surface of the flow path of the gas circulating in the turbine between the airfoils and also comprises an upstream lip and a downstream lip which extend radially outward from said platform and circumferentially from one of the two lateral edges of this platform to the other.

During the rotation of the rotor, the upstream and downstream lips interact, by rubbing, with fixed abradable elements assembled opposite on a radially inner face of the outer casing of the turbine, in order to ensure the seal. These different abradable elements are circumferentially assembled end-to-end to form an abradable material ring.

A seal of labyrinth type is thus formed and makes it possible to limit the flow of air passing axially through the space located between the radially outer end of the rotor and the stator, more precisely between the radially outer end of the rotor and the abradable material ring.

The rotor/stator clearance plays an essential part in the correct efficiency of the low-pressure turbine. Limiting this clearance makes it possible to maximize the working flow in the rotor and reduce the leakage flow rate. The seal also makes it possible to minimize the shear between the leakage air flowing between the radially outer heel and the stator and the air circulating through the air path, this shear producing so-called "mixing" losses.

However, the maintaining of a small clearance between the lips and the abradable material ring can lead by differential thermal expansion to a situation of contact between these lips and the abradable material. Such a situation can even lead to the locking of the rotor in some cases.

In the prior art, lips with straight edges are known. In the invention, it is envisioned to make cut-outs at the apices of the lips so that the lips penetrate the abradable material with a minimal cutting force to avoid rotor locking phenomena. However, using these cut-outs risks causing the formation of an additional clearance between the rotor and the stator and therefore irregular leakage flow rates.

Moreover, the upstream and downstream parts of the platform can have various shapes and comprise notches, particularly in order to reduce the weight of the platform and limit forces due to the centrifugal force undergone by this platform. According to the invention, an aim is to make further weight savings where these designs are concerned.

From the document US 2018/0 10 467 there is also known a turbine rotor extending around a longitudinal axis, comprising a blading bearing at its periphery at least one blade, the airfoil of the blade being provided at its radially outer end with a heel, this heel comprising a platform equipped with an upstream lip and a downstream lip.

The platform has a front lateral edge and a back lateral edge with respect to the normal direction of rotation of the rotor about the longitudinal axis, as well as a suction face portion which extends from said front lateral edge to the suction face of the airfoil.

However, these lips do not have a sawtooth shape, defining teeth of triangular or truncated rectangle shape equipped with front edges perpendicular to the platform and radially outer ends which are straight and inclined backward from the apex of the front edge in the direction of the platform.

Consequently, the leakage flow rate at the lip apex is not limited.

SUMMARY OF THE INVENTION

The invention has the aim of limiting the leakage flow rate at the lip apex.

For this purpose, the invention relates to a rotor of a turbine extending around a longitudinal axis, comprising at least one blading bearing at its periphery at least one blade, each blade comprising an airfoil provided at its radially outer end with a heel, this heel comprising a platform equipped with an upstream lip and a downstream lip which extend radially outward from this platform, the platform having a front lateral edge and a back lateral edge with respect to the normal direction of rotation of the rotor about the longitudinal axis, and a suction face portion which extends from said front lateral edge to the suction face of the airfoil.

In accordance with the invention, the upstream lip and the downstream lip each comprise sawtooth-shaped cut-outs such as to form a front tooth and a back tooth with respect to the normal direction of rotation of the rotor about the longitudinal axis, in that the front tooth and the back tooth of each lip have a triangular shape or a truncated rectangle shape, in that the front tooth and the back tooth of each lip are contiguous, in that the front teeth of the lips have a front edge perpendicular to the platform and a radially outer edge which is straight and inclined backward from the apex of the front edge in the direction of the platform and in that the back teeth of the lips have a cutting edge perpendicular to the platform and a radially outer edge which is straight and inclined backward from the apex of the cutting edge in the direction of the platform and in that the front tooth of each lip is disposed on the suction face portion of the platform.

Owing to these features of the invention, and particularly to the fact that on each lip, the front tooth and the back tooth are contiguous and that the front tooth is disposed on the suction face portion of the platform, this results in the empty space located between the radially outer edge of the front tooth and the cutting edge of the back tooth then becoming positioned at a place where the leakage flow rate density is low, since the pressure at the boundaries of the lips is dictated by the air circulating in the air path. The pressure on the suction face side of the blade is lower than on the pressure face side.

Conversely, owing to the aforementioned features of the invention, the back tooth then contrariwise becomes positioned at a place where the leakage flow rate density is high.

Thus, the leakage flow rates are reduced.

According to other advantageous and non-limiting features of the invention, taken alone or in combination:
- the cutting edge of the back tooth of the downstream lip is disposed nearer to the suction face than to the front lateral edge;
- the cutting edge of the back tooth of the upstream lip is disposed in alignment with the suction face of the airfoil;
- the height of the cutting edge of the back tooth of the upstream lip is greater than the height of the front edge of the front tooth of this same upstream lip and/or the height of the cutting edge of the back tooth of the downstream lip is greater than the height of the front edge of the front tooth of this same downstream lip;
- the platform comprises an upstream platform portion which extends upstream from the upstream lip, and this upstream platform portion has a truncated parallelepipedal shape, the upstream lip of which defines one of the sides;
- the platform comprises a downstream platform portion which extends downstream from said downstream lip and this downstream platform portion has a truncated parallelepipedal shape, the downstream lip of which defines one of the sides.

The invention also relates to a turbine extending around a longitudinal axis, comprising a casing equipped on a radially inner face with an abradable material ring. In accordance with the invention, this turbine comprises a rotor as aforementioned, this rotor is disposed such that the apex of the back teeth of the upstream and downstream lips is disposed opposite the abradable material ring, such that for each upstream lip and each downstream lip, the space delimited by the abradable material ring, the front tooth and the cutting edge of the back tooth is positioned plumb with the abradable material ring.

Finally, the invention relates to a turbomachine, particularly for aircraft, which comprises a turbine as aforementioned.

DESCRIPTION OF THE FIGURES

Other features, aims and advantages of the invention will become apparent from the following description, which is purely illustrative and non-limiting, and which must be read with reference to the appended drawings wherein.

DETAILED DESCRIPTION OF THE INVENTION

Figure 1:
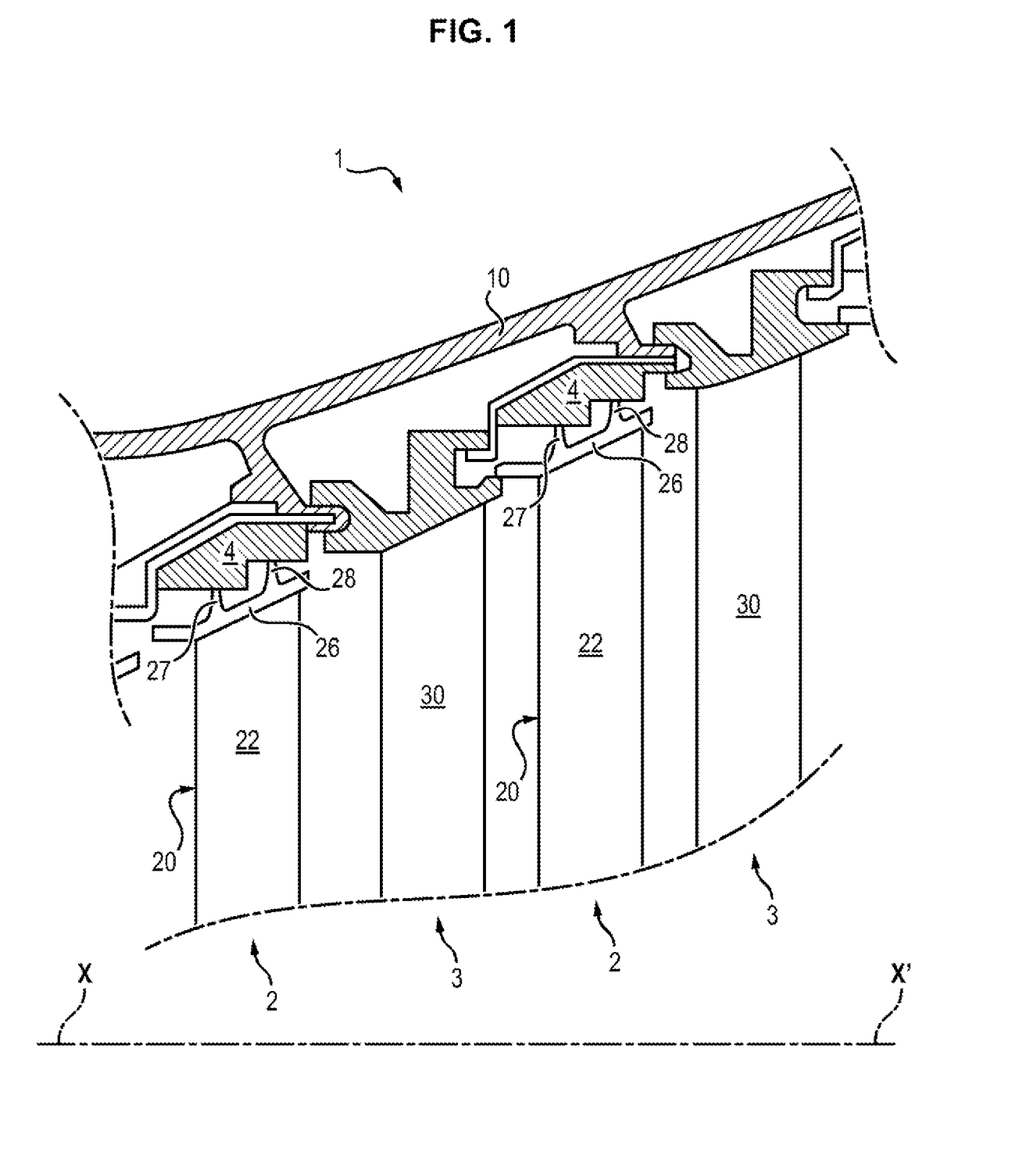
FIG. 1 shows a partial longitudinal axis section view of the radially outer part of a low-pressure turbine of a turbomachine.

FIG. 1 shows a part of a low-pressure turbine of a turbomachine, in a longitudinal section view (i.e., along the longitudinal axis X-X' of said turbine). As explained previously, this turbine 1 comprises several successive stages. Each stage includes a rotor 2, provided with blades 20 and a stator which comprises a nozzle 3, provided with fixed blades 30.

Figure 2:
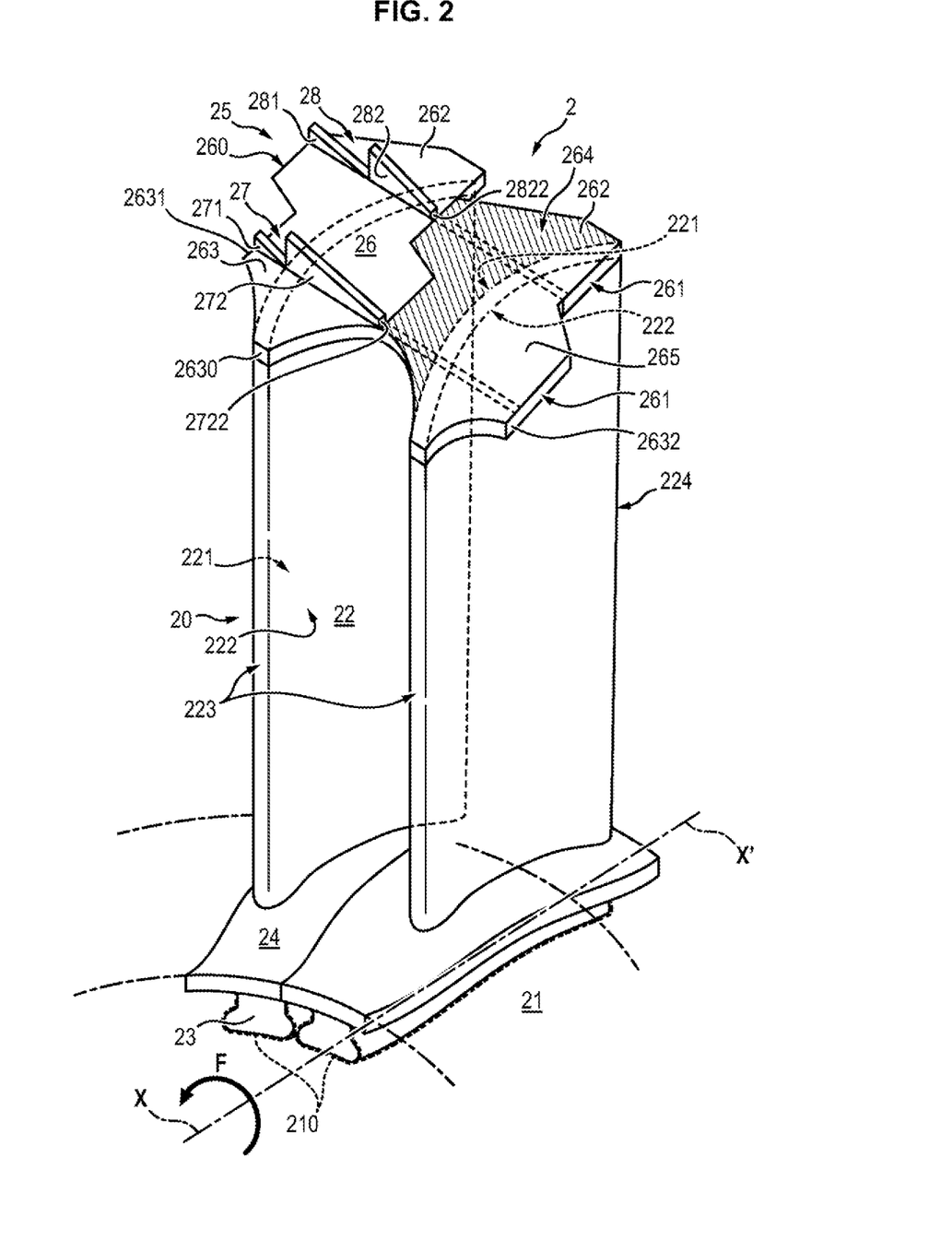
FIG. 2 is a diagram showing in perspective and partially a possible embodiment of the blades of a turbine rotor in accordance with the invention.

As can be seen on FIG. 2, the rotor 2 comprises a rotor disc 21 (blading) (shown in dotted lines), bearing at its outer periphery at least one blade 20, preferably the blades 20 which extend radially or substantially radially from this disc.

The rotor 2 is rotationally driven about its axis of rotation X-X' and along a normal direction of rotation shown by the arrow F in FIG. 2. The term "normal direction of rotation" should be understood to mean the direction in which the rotor rotates during the operation of the turbine. Furthermore, the different rotor discs 21 of the turbine are assembled together and rotationally driven about the longitudinal axis X-X'.

Each blade 20 comprises a profiled airfoil 22 and a radially inner root 23, having for example a dovetail shape or a similar shape, mounted in a recess 210 of corresponding shape fashioned at the periphery of the rotor disc 21. The airfoil 22 is separated from the root 23, by a radially inner heel 24. Finally, a radially outer heel 25 extends from the radially outer end (or distal end) of the airfoil 22.

Each airfoil 22 has a suction face 221 and a pressure face 222, a leading edge 223 and a trailing edge 224.

When the different blades 20 are attached to the rotor disc 21, their radially outer heels 25 are disposed edge-to-edge in such a way as to form a rotary circumferential ring delimiting a surface of revolution about the axis of rotation X-X' of the disc.

More precisely, each radially outer heel 25 comprises a platform 26, which delimits the outer surface of the air flow path of the gas circulating through the turbine between the airfoils 22 and which has a first and a second opposite lateral edge 260, 261. The edge 260 is referred to as the "front lateral edge" and the edge 261 the "back lateral edge". In the rest of the description and the claims, the terms "front" and "back" are defined with respect to the normal direction of rotation of the rotor. Note also that the front lateral edge 260 is the edge located on the suction face side of the airfoil 22 and that the back lateral edge 261 is the edge located on the pressure face side of the airfoil 22.

Furthermore, each radially outer heel 25 also comprises an upstream sealing lip 27 and a downstream sealing lip 28, which extend radially or substantially radially outward from the platform 26 and circumferentially from one lateral edge 260 to the other lateral edge 261 of this platform.

When the different blades 20 are attached to the rotor disc 21, as shown in FIG. 2, their respective radially outer platforms 26 are disposed end-to-end such that the back lateral edge 261 of one platform is in contact with the front lateral edge 260 of the following platform and the different upstream lips 27 (or the different downstream lips 28 respectively) are then also disposed edge-to-edge in such a way as to form an upstream rotary ring of axis X-X', (or a downstream rotary ring respectively).

As can be seen in FIG. 1, the upstream 27 and downstream 28 lips are disposed opposite an abradable material ring 4, attached opposite on a radially inner face of the outer casing 10 of the turbine 1, in order to form a seal of labyrinth type.

In the exemplary embodiment shown in FIG. 2, it can be seen that the front lateral edge 260 and the back lateral edge 261 have, in the central region of the platform 26, i.e. between the two lips 27 and 28, a contour in the shape of a broken line. Other shapes may be envisioned as long as they are complementary to one another and allow the aforementioned assembly.

Furthermore, the platform 26 has a downstream platform portion 262, which extends downstream from said downstream lip 28. Similarly, the platform 26 has an upstream platform portion 263, which extends upstream from said upstream lip 27.

FIG. 2 deliberately avoids showing in their entirety the upstream and downstream lips of the blade located on the right side of the figure, in order to better visualize the shape of the platform 26 and of its upstream 263 and downstream 262 portions. These lips are shown by dotted lines.

Moreover and as seen more clearly in FIG. 2, the platform 26 has a portion, the so-called "suction face portion" 264, which extends from the front lateral edge 260 to the suction face 221 of the airfoil 22 and a portion, the so-called "pressure face portion" 265, which extends from the pressure face 222 of the airfoil 22 to the back lateral edge 261. In FIG. 2, the suction face portion 264 has been shown as a shaded area.

Figure 3:
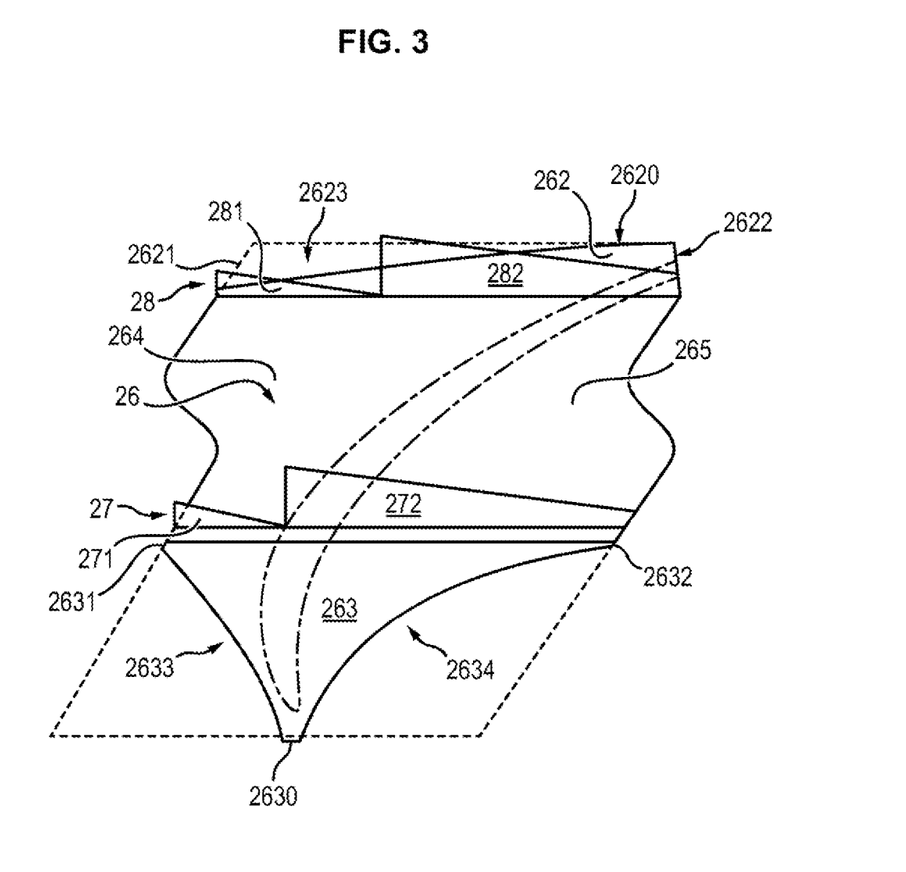
FIG. 3 is a diagram representing the radially outer heel of a blade in accordance with the invention.

As seen more clearly on FIG. 3, and according to a possible embodiment of the invention, the downstream platform portion 262 has the shape of a parallelepiped and therefore comprises a downstream edge 2620, on the downstream side of the platform 26, a front lateral edge 2621 and a back lateral edge 2622 (see contour in dotted lines). Finally, the last side of this parallelepiped is delimited by the downstream lip 28.

According to a possible embodiment of the invention, the upstream platform portion 263 also has the shape of a parallelepiped and comprises an upstream edge 2630, on the upstream side of the platform 26, a front lateral edge 2631 and a back lateral edge 2632 (see contour in dotted lines). Finally, the last side of this parallelepiped is delimited by the upstream lip 27.

According to other possible embodiments of the invention, the parallelepiped forming the upstream platform portion 263 and/or the parallelepiped forming the downstream platform portion 262 is truncated and has one or more notches such as to reduce the weight of the platform 26.

On the exemplary embodiment shown in the figures, the two portions 263 and 262 are truncated and examples of notches are described hereinafter.

Thus, preferably, the downstream platform portion 262 comprises a notch 2623, fashioned in the angle between the downstream edge 2620 and the front lateral edge 2621.

Preferably, this notch 2623 has a straight edge. This contour could also have other shapes, for example a curved shape, preferably concave.

Still preferably, this notch 2623 extends from a point of the front lateral edge 2621 located near the downstream lip 28 to a point of the downstream edge 2620 located plumb with the trailing edge 224 of the airfoil 22.

Preferably, the upstream platform portion 263 comprises two notches, namely a front notch 2633, fashioned in the angle between the front lateral edge 2631 and the upstream edge 2630 and a back notch 2634, fashioned in the angle between the back lateral edge 2632 and the upstream edge 2630.

Preferably, these two notches 2633 and 2634 have an incurvated and concave contour. Other shapes could be envisioned, for example a straight shape.

Still preferably, the front notch 2633 extends from a point of the front lateral edge 2631 located near the upstream lip 27 to a point of the upstream edge 2630 located plumb with the leading edge 223, on the suction face side 221, such as to remove a maximum of material from the upstream platform portion while keeping this upstream portion radially above the airfoil 22.

Still preferably, the back notch 2634 extends from a point of the back lateral edge 2632 located near the upstream lip 27 to a point of the upstream edge 2630 located plumb with the leading edge 223, on the pressure face side 222, for the same reasons.

Figure 4:
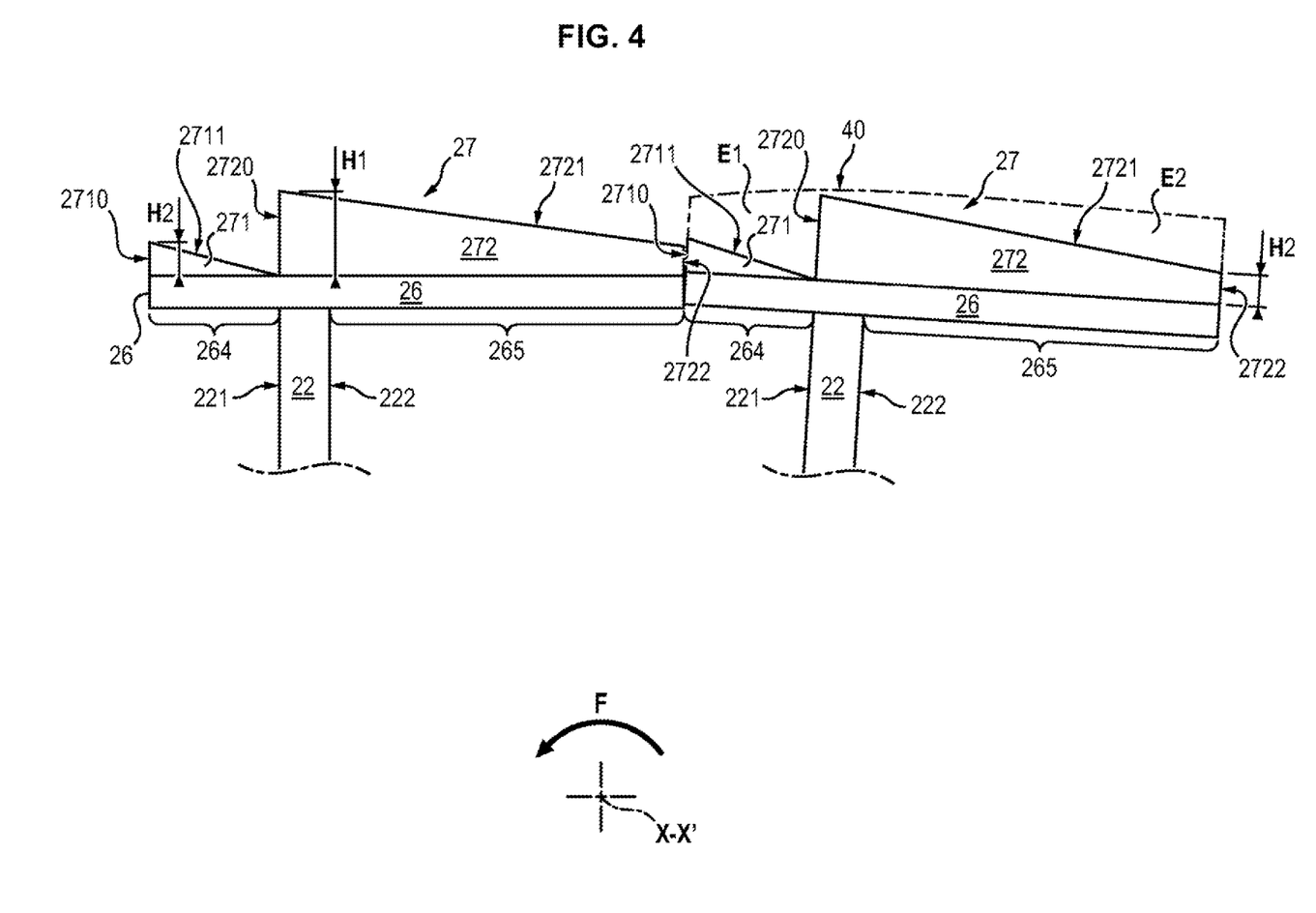
FIG. 4 is a schematic section view of two contiguous blade portions and their respective upstream lips.
Figure 5:
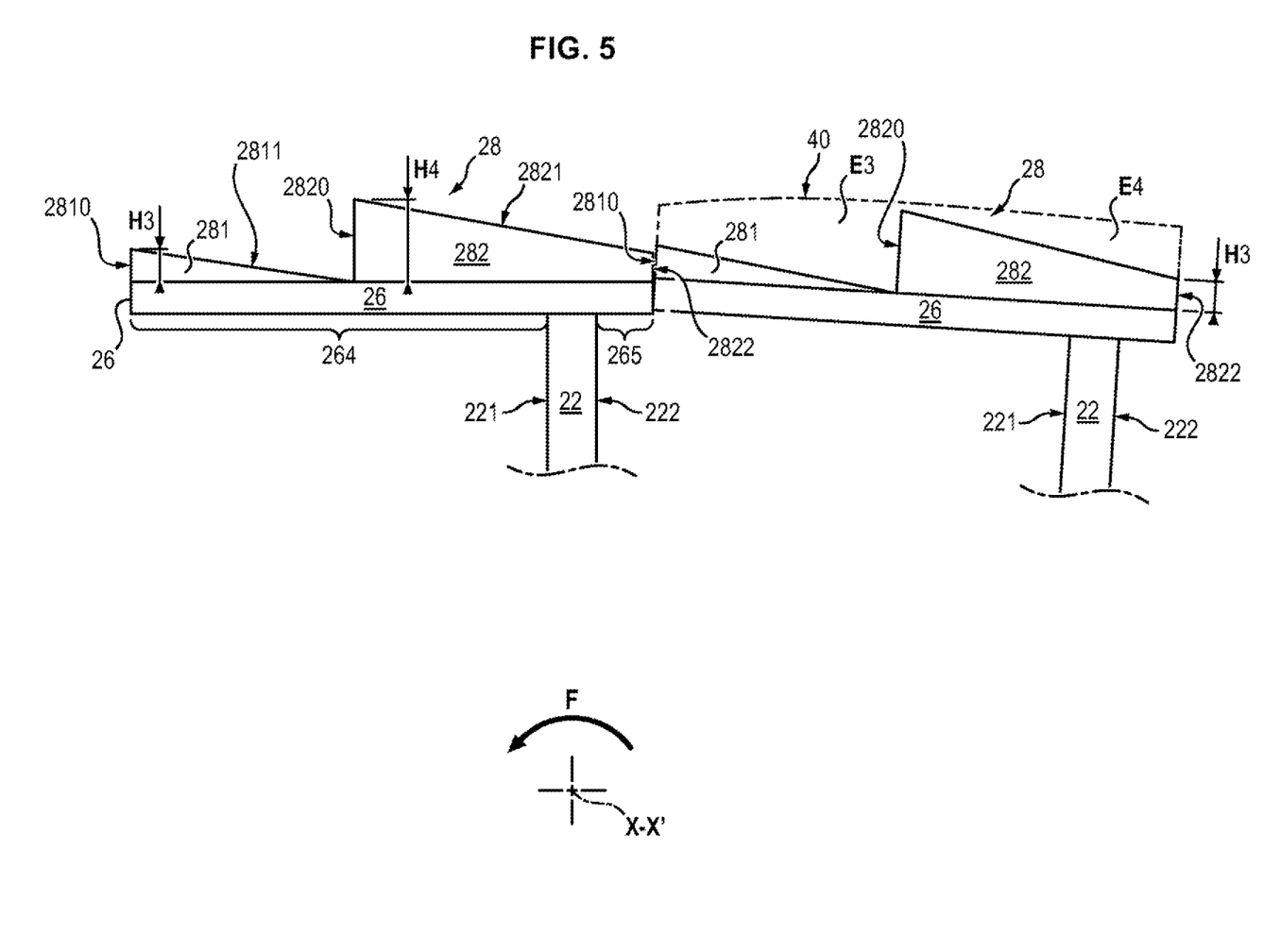
FIG. 5 is a schematic section view of two contiguous blade portions and their respective downstream lips.

In accordance with the invention and as can be seen more easily in FIGS. 4 and 5, the upstream lip 27 and the downstream lip 28 have sawtooth-shaped cut-outs such as to form two contiguous teeth, namely for the upstream lip 27, a front tooth 271 and a back tooth 272 and for the downstream lip 28, a front tooth 281 and a back tooth 282, the front and back being defined with respect to the normal direction of rotation of the rotor about the axis X-X' (arrow F)

As can be seen in these figures, the front teeth 271, 281 each have a front edge 2710, 2810 and the back teeth 272, 282, a cutting edge 2720, 2820 also oriented forward with respect to the direction of rotation and which is configured in such a way as to be able to shear the abradable material 4 in the event of contact with it.

The front 271, 281 or back 272, 282 teeth preferably have a triangular shape or a truncated rectangle shape.

In the exemplary embodiment shown in the figures, it is the front teeth 271, 281 which are triangular and the back teeth 272, 282 which have a truncated rectangle shape.

The front tooth 271 has a radially outer edge 2711 inclined backward in the direction of the platform 26 from the apex of the front edge 2710 to the base of the cutting edge 2720 of the back tooth 272, while the front tooth 281 has a radially outer edge 2811 inclined backward from the apex of the front edge 2810 to the base of the cutting edge 2820 of the back tooth 282.

The back tooth 272 has a radially outer edge 2721 inclined in the direction of the platform 26 from the apex of the cutting edge 2720 to a back edge 2722 of the back tooth 272 (more visible in FIG. 2). Similarly, the back tooth 282 has a radially outer edge 2821 inclined in the direction of the platform 26 from the apex of the cutting edge 2820 to a back edge 2822 of the back tooth 282.

Preferably, the front edges 2710, 2810, and the back edges 2722, 2822 are perpendicular to the plane of the platform 26 or slightly inclined, such that when two platforms 26 are placed end-to-end, the back edge 2722 of the back tooth 272 of the upstream lip 27 of a platform is in contact with the front edge 2710 of the front tooth 271 of the upstream lip 27 of the contiguous platform, to ensure the continuity of the upstream lips over the circumference. The same applies for the downstream lips 28.

Also preferably, the back edge 2722 of the upstream lip 27 is the same height H2 as its front edge 2710, such that when two blades 2 (and therefore two platforms 26) are placed side to side, the back edge of one is at the same level as the front edge of the other. Preferably, the same applies for the height H3 of the front edge 2810 and of the back edge 2822.

The cutting edges 2720, 2820 are preferably perpendicular to the plane of the platform 26.

Preferably, the cutting edge 2720 of the back tooth is of a height greater than the front edge 2710 of the front tooth 271 and it is for this reason that it will shear the abradable material 4, (height H1 between the apex of the cutting edge 2720 and the platform 26 greater than the height H2 between the apex of the front edge 2710 and the platform 26). In the same way, preferably, the height H4 of the cutting edge 2820 of the back tooth 282 is greater than the height H3 of the front edge 2810.

In the embodiment that has just been described, the radially outer edges 2711, 2721, 2811, 2821 have a straight contour. However, at least one of these contours could be slightly curved and convex.

In accordance with the invention, the cut-outs of the upstream and downstream lips are done such that the front and back teeth are positioned on the platform 26 at points making it possible to compensate for irregularities in the leakage flow rate.

The air pressure circulating in the air path and therefore also circulating between the platform 26 and the abradable material ring 4 is higher upstream than downstream, which allows the air to circulate in the turbine 1. Moreover, the pressure which is exerted on the pressure face 222 is greater than that exerted on the suction face 221 of the airfoil 22, such that the rotor 2 rotates.

Consequently, the pressure $P_{upstream\ suction}$ exerted by the leakage air on the upstream lip 27 on the suction face side is greater than the pressure $P_{upstream\ pressure}$ exerted on the upstream lip 27 on the pressure face side, which is itself greater than the pressure $P_{downstream\ suction}$ exerted by the leakage air on the downstream lip 28 on the suction face side, the latter being itself greater than the pressure $P_{downstream\ pressure}$ exerted by the leakage air on the downstream lip 28 on the pressure face side. The term "leakage air" should be understood to mean the air circulating between the platform 26 and the abradable material 4.

Moreover, on the right half of FIGS. 4 and 5, a mixed line shows the level 40 at which the abradable material 4 is located, when the rotor 2 is assembled in the turbine 1.

On the upstream lip 27, cut-outs are made such that the front tooth 271 is positioned on the suction face portion 264 of the platform 26. Thus, as can be seen in FIG. 4, the space E1 delimited by the abradable material 4, the front tooth 271 and the cutting edge 2720 of the back tooth 272 then becomes positioned plumb with the suction face portion 264 of the platform, i.e. in a place where the leakage flow rate is low. In addition, as the height H2 of the front tooth 271 is preferably less than the height H1 of the back tooth 272, this space E1 is all the larger.

Conversely, and given that the front 271 and back 272 teeth are contiguous, the back tooth 272 then becomes positioned mainly on the pressure face portion 265 of the platform 26 and in the place where the leakage flow rate is higher, thus limiting leakages. The space E2 which extends between the back tooth 272 and the abradable material 4 (line 40) is of reduced surface area, which limits the leakage flow rate in this place.

Still preferably, the teeth are positioned such that the cutting edge 2720 of the back tooth 272 is disposed nearer to the suction face 221 of the airfoil 22 than to the front lateral edge 260 and still preferably, such that it is disposed in alignment with the suction face 221 of the airfoil 22. Thus, the space E1 located above the suction face space 264 is as large as possible.

The total leakage section, i.e., the sum of the areas E1 and E2, remains unchanged by comparison with the prior art, but the leakage flow rate is reduced.

Similarly, on the downstream lip 28, the cut-outs are made such that the front tooth 281 is positioned on the suction face portion 264 of the platform 26. Thus, as can be seen in FIG. 5, the space E3 delimited by the abradable material 4, the front tooth 281 and the cutting edge 2820 of the back tooth 282 then becomes positioned plumb with the suction face portion 264 of the platform, i.e., at a place where the leakage flow rate is lower.

Still preferably, the teeth are positioned such that the cutting edge 2820 of the back tooth 282 is disposed nearer to the suction face 221 than to the front lateral edge 260.

The total leakage section, i.e., the sum of the areas E3 and E4, remains unchanged by comparison with the prior art, but the leakage flow rate is reduced.

If the platform 26 is not truncated, a reduction in the leakage flow rate is observed and if the platform 26 has notches such as the aforementioned notches 2623, 2633 and 2634, this improvement is further increased.

The invention claimed is:

1. A rotor of a turbine extending around a longitudinal axis,
    the rotor comprising at least one rotor disc bearing at a periphery of the at least one rotor disc at least one blade, each blade comprising an airfoil a heel being provided at the radially outer end of the airfoil,
    wherein the heel comprises a platform equipped with an upstream lip and a downstream lip which extend radially outward from the platform,
    wherein the platform has a front lateral edge and a back lateral edge with respect to the direction of rotation of the rotor about the longitudinal axis, during the operation of the turbine,
    wherein the airfoil has a suction face,
    wherein the platform has a suction face portion which extends from the front lateral edge to the suction face of the airfoil,
    wherein the upstream lip and the downstream lip each comprise sawtooth-shaped cut-outs forming a front tooth and a back tooth on each lip with respect to the direction of rotation of the rotor about the longitudinal axis,
    wherein the front tooth and the back tooth of each lip are formed into a triangular shape or a truncated rectangle shape,
    wherein the front tooth and the back tooth of each lip are contiguous,
    wherein the front tooth of the upstream lip and the front tooth of the downstream lip have a front edge perpendicular to the platform and a radially outer edge which is straight and inclined backward from an apex of the front edge in the direction of the platform,
    wherein the back tooth of the upstream lip and the back tooth of the downstream lip have a cutting edge perpendicular to the platform and a radially outer edge which is straight and inclined backward from an apex of the cutting edge in the direction of the platform, and wherein the front tooth of each lip is disposed on the suction face portion of the platform, wherein the cutting edge of the back tooth of the downstream lip is disposed nearer to the suction face of the airfoil than to the front lateral edge of the platform.

2. The rotor as claimed in claim 1, wherein the platform comprises an upstream platform portion which extends upstream from the upstream lip, wherein the upstream platform portion has a truncated parallelepipedal shape with sides and wherein the upstream lip defines one of the sides of the upstream platform portion.

3. The rotor as claimed in claim 1, wherein the platform comprises a downstream platform portion which extends downstream from the downstream lip, wherein the downstream platform portion has a truncated parallelepipedal shape with sides, and wherein the downstream lip defines one of the sides of the downstream platform portion.

4. A turbine extending around a longitudinal axis, the turbine comprising an outer casing with a radially inner face, the radially inner face of the outer casing being equipped with an abradable material ring, and a rotor as claimed in claim 1, wherein the rotor is disposed such that an apex of the back tooth of the upstream lip and an apex of the back tooth of the downstream lips are disposed opposite the abradable material ring, such that for each upstream lip and each downstream lip, a space delimited by the abradable material ring, by the front tooth and by the cutting edge of the back tooth is positioned plumb with the abradable material ring.

5. A turbomachine comprising the turbine of claim 4.

6. A turbomachine for an aircraft which comprises the turbine of claim 4.

7. A rotor of a turbine extending around a longitudinal axis, the rotor comprising at least one rotor disc bearing at a periphery of the at least one rotor disc at least one blade, each blade comprising an airfoil a heel being provided at the radially outer end of the airfoil, wherein the heel comprises a platform equipped with an upstream lip and a downstream lip which extend radially outward from the platform, wherein the platform has a front lateral edge and a back lateral edge with respect to the direction of rotation of the rotor about the longitudinal axis, during the operation of the turbine, wherein the airfoil has a suction face, wherein the platform has a suction face portion which extends from the front lateral edge to the suction face of the airfoil, wherein the upstream lip and the downstream lip each comprise sawtooth-shaped cut-outs forming a front tooth and a back tooth on each lip with respect to the direction of rotation of the rotor about the longitudinal axis, wherein the front tooth and the back tooth of each lip are formed into a triangular shape or a truncated rectangle shape, wherein the front tooth and the back tooth of each lip are contiguous, wherein the front tooth of the upstream lip and the front tooth of the downstream lip have a front edge perpendicular to the platform and a radially outer edge which is straight and inclined backward from an apex of the front edge in the direction of the platform, wherein the back tooth of the upstream lip and the back tooth of the downstream lip have a cutting edge perpendicular to the platform and a radially outer edge which is straight and inclined backward from an apex of the cutting edge in the direction of the platform, and wherein the front tooth of each lip is disposed on the suction face portion of the platform, wherein the cutting edge of the back tooth of the upstream lip is disposed in alignment with the suction face of the airfoil.

8. The rotor as claimed in claim 7, wherein the platform comprises an upstream platform portion which extends upstream from the upstream lip, wherein the upstream platform portion has a truncated parallelepipedal shape with sides and wherein the upstream lip defines one of the sides of the upstream platform portion.

9. The rotor as claimed in claim 7, wherein the platform comprises a downstream platform portion which extends downstream from the downstream lip, wherein the downstream platform portion has a truncated parallelepipedal shape with sides, and wherein the downstream lip defines one of the sides of the downstream platform portion.

10. A turbine extending around a longitudinal axis, the turbine comprising an outer casing with a radially inner face, the radially inner face of the outer casing being equipped with an abradable material ring, and a rotor as claimed in claim 7, wherein the rotor is disposed such that an apex of the back tooth of the upstream lip and an apex of the back tooth of the downstream lips are disposed opposite the abradable material ring, such that for each upstream lip and each downstream lip, a space delimited by the abradable material ring, by the front tooth and by the cutting edge of the back tooth is positioned plumb with the abradable material ring.

11. A rotor of a turbine extending around a longitudinal axis, the rotor comprising at least one rotor disc bearing at a periphery of the at least one rotor disc at least one blade, each blade comprising an airfoil a heel being provided at the radially outer end of the airfoil, wherein the heel comprises a platform equipped with an upstream lip and a downstream lip which extend radially outward from the platform, wherein the platform has a front lateral edge and a back lateral edge with respect to the direction of rotation of the rotor about the longitudinal axis, during the operation of the turbine, wherein the airfoil has a suction face, wherein the platform has a suction face portion which extends from the front lateral edge to the suction face of the airfoil, wherein the upstream lip and the downstream lip each comprise sawtooth-shaped cut-outs forming a front tooth and a back tooth on each lip with respect to the direction of rotation of the rotor about the longitudinal axis, wherein the front tooth and the back tooth of each lip are formed into a triangular shape or a truncated rectangle shape, wherein the front tooth and the back tooth of each lip are contiguous, wherein the front tooth of the upstream lip and the front tooth of the downstream lip have a front edge perpendicular to the platform and a radially outer edge which is straight and inclined backward from an apex of the front edge in the direction of the platform, wherein the back tooth of the upstream lip and the back tooth of the downstream lip have a cutting edge perpendicular to the platform and a radially outer edge which is straight and inclined backward from an apex of the cutting edge in the direction of the platform, and wherein the front tooth of each lip is disposed on the suction face portion of the platform, wherein a height of the cutting edge of the back tooth of the upstream lip is greater than a height of the front edge of the front tooth of the same upstream lip and/or wherein a height of the cutting edge of the back tooth of the downstream lip is greater than a height of the front edge of the front tooth of the same downstream lip.

12. The rotor as claimed in claim 11, wherein the platform comprises an upstream platform portion which extends upstream from the upstream lip, wherein the upstream platform portion has a truncated parallelepipedal shape with sides and wherein the upstream lip defines one of the sides of the upstream platform portion.

13. The rotor as claimed in claim 11, wherein the platform comprises a downstream platform portion which extends downstream from the downstream lip, wherein the downstream platform portion has a truncated parallelepipedal shape with sides, and wherein the downstream lip defines one of the sides of the downstream platform portion.

14. A turbine extending around a longitudinal axis, the turbine comprising an outer casing with a radially inner face, the radially inner face of the outer casing being equipped with an abradable material ring, and a rotor as claimed in claim 11, wherein the rotor is disposed such that an apex of the back tooth of the upstream lip and an apex of the back tooth of the downstream lips are disposed opposite the abradable material ring, such that for each upstream lip and each downstream lip, a space delimited by the abradable material ring, by the front tooth and by the cutting edge of the back tooth is positioned plumb with the abradable material ring.

* * * * *